United States Patent [19]

Baron et al.

[11] 4,017,457
[45] Apr. 12, 1977

[54] FLAME RETARDANT POLYCARBONATE COMPOSITIONS

[75] Inventors: Arthur L. Baron; Parameswar Sivaramakrishnan, both of New Martinsville, W. Va.

[73] Assignee: Mobay Chemical Corporation, Pittsburgh, Pa.

[22] Filed: Oct. 6, 1975

[21] Appl. No.: 620,488

[52] U.S. Cl. .................................. 260/45.75 P
[51] Int. Cl.² .................................. C08K 5/56
[58] Field of Search ................. 260/45.75 P

[56] References Cited

UNITED STATES PATENTS

| | | |
|---|---|---|
| 3,475,372 | 10/1969 | Gable ........................... 260/45.75 |
| 3,577,346 | 5/1971 | McKeown ..................... 260/45.75 |
| 3,816,367 | 6/1974 | Larkin et al. ................. 260/45.7 R |
| 3,926,881 | 12/1975 | Kracklauer et al. ........ 260/45.75 P |

*Primary Examiner*—V. P. Hoke
*Attorney, Agent, or Firm*—Gene Harsh; Lawrence S. Pope; Frederick H. Colen

[57] ABSTRACT

Polycarbonate articles are provided with enhanced flame retardant characteristics by the addition of ferrocene and derivatives thereof to polycarbonate resins.

9 Claims, No Drawings

FLAME RETARDANT POLYCARBONATE COMPOSITIONS

BACKGROUND OF THE INVENTION

1. Field of the Invention

This invention relates to polycarbonates and more particularly to polycarbonates having flame retardant characteristics.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

However, these polymers exhibit a brief though definite burning time when contacted with an open flame and do not meet a specified requirement for flamability resistance in applications where high temperatures and/or exposure to fire may be encountered. In addition, stabilizers or other functional additives which are normally used in polycarbonates will further modify the burning characteristics of the plastic, to make them unacceptable where a certain flame retardance requirement is specified.

Also, stabilizers and functional additives such as monomeric phosphates, phosphoric acid esters and thiophosphoric acid esters containing halogenated alkyl radicals have been incorporated into polymers to increase their flame resistant properties. Metal salts have also been utilized to provide flame retardance characteristics to polycarbonates. Further, in aromatic polycarbonate resins some of the phenolic diols used in the production thereof have chlorine or bromine atoms substituted on the aromatic ring to provide flame resistant characteristics to the final polycarbonate.

However, these stabilizers and halogenated phenolic diols have to be employed in such large quantities in order to obtain the flame resistant characteristics that they reduce the desirable physical properties of the polymers such as impact strength and even cause considerable deterioration in other physical properties such as resistance to hydrolysis. A particular disadvantage in using the halogenated diols in the synthesis of the polycarbonate is the increased cost of the final resin to an economically undesirable extent.

Illustrative of the techniques utilized to provide flame retardant characteristics to polycarbonates is U.S. Pat. No. 3,475,372. Therefore, in accordance with the present invention, self-extinguishing and flame resistant polycarbonates are provided which are substantially unmodified in physical properties.

SUMMARY OF THE INVENTION

A polycarbonate is provided with enhanced flame retardant characteristics which is comprised of a polycarbonate resin, and ferrocene or derivatives of ferrocene and mixtures thereof.

DETAILED DESCRIPTION OF THE INVENTION

When used herein "polycarbonate resin" means the neat resin without additives; "Polycarbonate" means both the formulated polycarbonate resin with additives therein and also the final molded plastic product.

The polycarbonate resins useful in practice of the invention are produced by reacting di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert - butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for exampl (4,4'-dihydroxy-diphenyl)-methane, 2,2'-(4,4'-dihydroxy-diphenyl)-propane, 1,1-(4,4'-dihydroxy-diphenyl-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-di-tert.-butyl-diphenyl)-propane or 1,1'-84,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°-150° C), 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4'-dihydroxy-diphenyl)-4-methylpentane, 2,2-(4,4'-dihydroxy-diphenyl)-heptane, 4,4-(4,4'-dihydroxy-diphenyl)-heptane (melting point 148°-149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane.

Suitable di-(monohydroxyaryl)-alkanes, the aryl residues of which carry halogen atoms are for instance 2,2-(3,5,3'5'-tetrachloro-4,4'-dihydroxy-diphenyl)-propane, 2,2-(3,5,3'5'-tetrabromo-4,4'-dihyroxy-diphenyl)-propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxy-diphenyl)- phenyl-methane and 1,1-(4,4'-dihydroxy-diphenyl)-1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxydiphenylene, 2,2'-dihydroxy-diphenylene, dihydroxynaphthalene, dihydroxyanthacene and compounds represented by the structural formula:

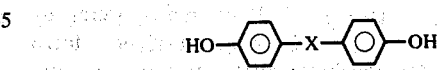

wherein X is S,

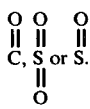

In order to obtain special properties, mixtures of various (di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'-dihydroxydiphenyl)-propane]. Thus when flame retardant characteristics are to be imparted to the basic polycarbonate resin, a mixture of bisphenol A and tetrabromobisphenol A [2,2-(3,5,3'5'-tetrabromo4,4'-dihydroxydiphenyl)-propane] is utilized when reacting with phosgene or a like carbonic acid derivative.

The polycarbonates resins are prepared by methods known to those skilled in the art and more particularly by methods disclosed in U.S. Pat. No.3,028,365 incorporated herein by reference.

In some uses, pigments may be added to the polycarbonate to form opaque colored molded products. Predominantly titanium dioxide is used to opacify the polycarbonate to form a white molded produtct. If a colored product is desired, pigments such as chrome yellows and oranges, and chrome greens may be added to provide various colors to the article.

Iron oxides, iron blues and iron based pigments cannot be used because such iron compounds cause color instability and are detrimental to mechanical properties when used in polycarbonates. Further titanium dioxide in combination with a black pigment such as lamp black may be utilized to form black molded articles.

If a transparent colored article is desired, oil soluble dyes may be incorporated into the polycarbonate formulation by methods known to those skilled in the art.

Ferrocene and ferrocene derivatives are useful in the practice of the invention. Suitable ferrocene derivatives are the di-$\pi$-cyclopentadieneyl iron complexes represented by the structural formula:

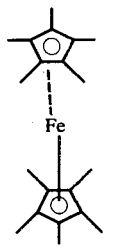

Various substituents may be pendant on the cyclopentadienyl ring. Representatives of these compounds are di-$\pi$-cyclopentadienyl iron (ferrocene), bis-indenyliron (II) (dibenzferrocene), 1,1'-diacetylferrocene, 1,2 diacetylferrocene, 1,1-diferroceneylethane, dimethylaminoethylferrocene, methylamino methyl-ferrocene, ferrocenylacetonitrile, ferrocenylcarbonal, ferrocene-sulfonic acid, 1,2 di-ferrocenylethane, di-ferrocenylmethane, phenylferrocene, ferrocenecarboxaldehyde, the $\omega$-ferrocenyl aliphatic acids, phenylcyclopentaferrocene, 1,1' (-1,3-cyclopenylene) ferrocene phenylcyclopentylferrocene and the like compounds, benzoylferrocene, acetylferrocene.

Also heterocyclic $\pi$ complexes such as azaferrocene may be utilized. The critical feature of the ferrocenes that may be used to enhance the flame retardant characteristics of polycarbonates is the presence of structure (A) within the molecule. Since ferrocene is aromatic, it undergoes typical aromatic substitution reactions such as Friedel-Crafts acylation, alkylation, sulfonation, and aminomethylation, a wide range of compounds are available along with their derivatives. The only limitation regarding the ferrocene derivatives is that they do not degrade the polycarbonate in which they are incorporated.

Although the ferrocene and ferrocene derivatives used in the practice of the invention impart a slight coloring to the polycarbonate, they do not cause color instability or an appreciable reduction in mechanical properties. Thus the previously described ferrocenes may be utilized in the practice of the invention because of the basic di-$\pi$-cyclopentadienyl iron group which imparts the flame retardant characteristics to the polycarbonate resin.

Ferrocene and ferrocene derivatives may be incorporated into the polycarbonate resin at a level of 0.01 to 0.5% and more preferably 0.02 to 0.1% to impart flame retardant characteristics to the polycarbonate molded article. At levels of 0.1% and still higher, greater flame retardance is achieved. Ferrocenes are incorporated into the polycarbonate resin by methods known to those skilled in the art such as for example tumble blending prior to extrusion of the polycarbonate and similar known techniques.

A particularly advantageous practice of the present invention is the utilization of the ferrocene and ferrocene derivatives in polycarbonates which are polymerized from a mixture of bisphenol A and tetrabromobisphenol A. Usually enough tetrabromobisphenol A is incorporated into the polycarbonate to impart the desired level of flame retardance. In accordance with the practice of the invention the level of tetrabromobisphenol A may be reduced and a small amount of ferrocene may be added to produce the same flame retardant characteristic without a reduction in physical properties. Typically enough tetrabromobisphenol A is used in the synthesis of the polycarbonate to provide about 5 to 6% bromine in the polymers. With the addition of 0.025% ferrocene the bromine content of the polymer can be reduced to about 3 to 4% while still retaining the necessary flame retardant characteristics.

Further, the reduction in tetrabromobisphenol A is economically advantageous and also leads to lower smoke generation during combustion. This latter advantage is desirable in aircraft components and like applications.

The following examples are illustrative of the invention, but are not intended to limit its scope in any way.

EXAMPLE I

A polycarbonate resin having the repeating structural unit:

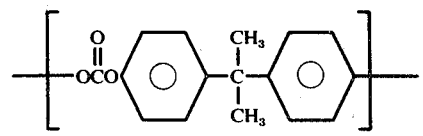

with a melt flow at 572° F (300° C) of 3 to 6 grams/10 min. (ASTM 1238) was tumble blended with 0.1% by weight based on the weight of the resin, of di-π-cyclopentadienyl iron (ferrocene) and tested for both viscosity characteristics and final product properties. The results of these tests along with the tests conducted with the resins of Examples II through IV are reported on Table 1.

The Izod notched impact tests were conducted on moldings of both ¼ inch and ⅛ inch thick samples made by conventional molding techniques. The ⅛ inch moldings were used for the UL-subject 94 flammability test, and oxygen index determination.

The UL-94 flammability test is a test specified by Underwriters Laboratories and widely accepted as an industry standard, the designations of flammability range from V-0 to V-2 with V-2 being the highest in flammability.

Oxygen index is defined as the volume percent oxygen in the test chamber atmosphere to sustain combustion of the sample and is more fully described under ASTM (D2863).

EXAMPLES II–IV

Example I was repeated except that acetylferrocene and benzoylferrocene were substituted for ferrocene in examples II and III respectively. Example IV was a control containing no ferrocene.

TABLE I

| | Example | | | |
|---|---|---|---|---|
| | I<br>ferro-<br>cene | II<br>acetyl-<br>ferro-<br>cene | III<br>benzoyl-<br>ferro-<br>cene | IV<br>none |
| Ferrocene | 0.1% | 0.1% | 0.1% | |
| Melt index g/10 min. at 300° C. | 5.0 | 4.5 | 4.2 | 4.8 |
| Izod Notched Impact ⅛" sample thickness | 17.26 | 17.05 | 16.49 | 16.63 |
| ¼" sample thickness | 2.50 | 2.58 | 2.40 | 2.43 |
| UL-94 ⅛" sample thickness | V-0 | V-0 | V-0 | V-2 |
| Avg. burning time sec. | 2.6 | 3.6 | 4.2 | |
| Oxygen index | 29.4 | | | 25.0 |
| Melt stability at 300° C. poise × 10⁴ at 72 sec.⁻¹ after 5 min. | 0.86 | | | 0.81 |
| 35 min. | 0.86 | | | 0.75 |
| 65 min. | 0.89 | | | 0.74 |
| delta viscosity¹ | +0.03 | | | −0.07 |
| Melt flow viscosity at variable shear rates 7.2 sec.⁻¹ poise × 10⁴ | 1.10 | | | 0.91 |
| 14.4 sec.⁻¹ poise × 10⁴ | 0.96 | | | 0.90 |
| 36.0 sec.⁻¹ poise × 10⁴ | 0.91 | | | 0.83 |
| 72.0 sec.⁻¹ poise × 10⁴ | 0.86 | | | 0.81 |
| 144.0 sec.⁻¹ poise × 10⁴ | 0.78 | | | 0.77 |
| 360.0 sec.⁻¹ poise × 10⁴ | 0.65 | | | 0.66 |
| 720.0 sec.⁻¹ poise × 10⁴ | 0.53 | | | 0.54 |
| 1440.0 sec.⁻¹ poise × 10⁴ | 0.40 | | | 0.41 |

¹delta viscosity = change in viscosity over 5 to 65 minutes.

The results of Examples I through IV demonstrate the utility of ferrocene and various ferrocene derivatives in the practice of the invention. The only requirement of the particular ferrocene derivative is that it contains the group

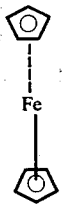

to enhance the flame retardant characteristics of the polycarbonate.

EXAMPLES V–XIV

A polycarbonate resin was synthesized using phosgene, tetrabromobisphenol A and bisphenol A. Sufficient tetrabromobisphenol A was used to produce a polycarbonate resin having 10% by weight bromine. The bromine containing polycarbonate resin was tumble blended with a bisphenol A phosgene polycarbonate resin having a melt flow of 3–6 grams/10 min. at 300° C (ASTM D1238) at various ratios to produce polycarbonate resins with a range of bromine contents. Ferrocene was added to the blends at different levels also by tumble blending. Samples were molded from the various polycarbonates and tested for oxygen index. Table II shows the bromine and ferrocene contents of the moulded polycarbonates along with their corresponding oxygen indices.

TABLE II

| Example | Percent by Weight Bromine | Percent by Weight Ferrocene | Oxygen Index |
|---|---|---|---|
| V (control) | 5.5 | — | 28.2 |
| VI | 5.5 | 0.010 | 31.0 |
| VII | 5.5 | 0.025 | 34.9 |
| VIII (control) | 4.5 | — | 28.2 |
| IX | 4.5 | 0.010 | 26.7 |
| X | 4.5 | 0.025 | 29.7 |
| XI (control) | 4.0 | — | 27.5 |
| XII | 4.0 | 0.025 | 29.4 |
| XIII (control) | 3.3 | — | 26.7 |
| XIV | 3.3 | 0.025 | 31.2 |

A commercially acceptable flame retardant grade of polycarbonate must contain 5.5% bromine when bromine is the sole source of flame retardant. As is shown in Table II, the amount of bromine can be substantially reduced (i.e. to 3.3 percent) when 0.025% ferrocene is added to the polycarbonate, while still maintaining the commercially necessary flame retardant characteristics.

EXAMPLES XV–XXI

A polycarbonate resin having a melt flow of 3 to 6 grams/min at 300° C. was tumble blended with ferrocene at various levels and tested for oxygen index, Izod impact and flamability in accordance with the UL-94 standard. The test results along with the ferrocene levels are reported on Table III.

Examples XV through XXI show that the impact properties of the polycarbonate with sufficient ferrocene to provide acceptable flame retarding are substantially unaltered when compared to the neat polycarbonate.

The use of ferrocene and ferrocene derivatives in non-halogenated polycarbonates provide a flame retardant plastic without deterioration in overall physical properties. In polycarbonates having halogenated reactants therein, the ferrocene acts as a synergist enhancing their flame retardant characteristics.

TABLE III

| Example | Percent by Weight Ferrocene | Oxygen Index | Izod Impact ft.lbs./in. Thickness | | UL-94 rating 1/8" Sample Thickness |
|---|---|---|---|---|---|
| | | | 1/8" | 1/4" | |
| XV (control) | — | 24.5 | 16.63 | 2.47 | Fails V-2 |
| XVI | 0.010 | 24.5 | | | Fails V-2 |
| XVII | 0.025 | 25.0 | | | V-2 |
| XVIII | 0.050 | 26.4 | | | V-2 |
| XIX | 0.10 | 29.4 | | | V-0 |
| XX | 0.10 | 28.2 | 15.52 | 2.32 | V-0 |
| XXI | 0.075 | 27.9 | 16.56 | 2.26 | V-0 |

The foregoing examples illustrate specific materials used to prepare flame retardant compositions. However, the invention is not to be limited only as is set forth in the accompanying claims.

What is claimed is:

1. A polycarbonate having improved flame retardant characteristics comprising:
a polycarbonate resin and an amount effective to provide flame retardant characteristics of a member selected from the group consisting of ferrocene and ferrocene derivatives, said polycarbonate resin produced by reacting compounds selected from the group consisting of di-(monohydroxyaryl)-alkanes, dihydroxybenzenes and substituted dihydroxybenzenes with compounds selected from the group consisting of carbonic acid diesters, phosgene, bis-chlorocarbonic acid esters of di-(monohydroxyaryl)-alkanes, bis-chlorocarbonic acid esters of dihydroxybenzenes and bis-chlorocarbonic acid esters of substituted dihydroxybenzenes and said ferrocene derivatives characterized in that they do not degrade the polycarbonate resin and in that they contain a structure represented by the formula:

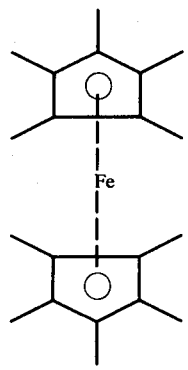

2. The polycarbonate of claim 1 wherein said ferrocene or ferrocene derivative is present at a level of 0.01 to 0.5 percent by weight based on the weight of said polycarbonate.

3. The polycarbonate of claim 2 wherein said ferrocene and ferrocene derivatives are selected from the group consisting of ferrocene, benzoylferrocene and acetylferrocene.

4. The polycarbonate of claim 3 wherein said polycarbonate resin is comprised of a resin characterized by the repeating structural formula:

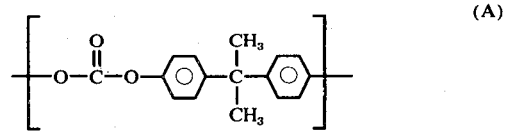

(A)

5. The polycarbonate of claim 4 wherein said polycarbonate contains moieties represented by the structural formula:

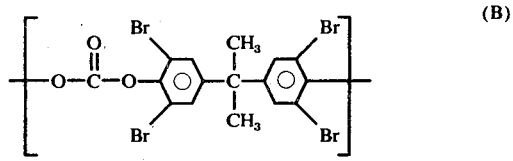

(B)

6. The polycarbonate of claim 5 wherein moiety (B) is present in sufficient quantity to provide 3 to 6% by weight of bromine in the polycarbonate resin.

7. The polycarbonate of claim 6 having therein 0.025 to 0.1% by weight ferrocene or ferrocene derivative.

8. The polycarbonate of claim 7 having therein 0.025 to 0.1% by weight ferrocene.

9. A process for improving the flame retardant characteristics of polycarbonate comprising blending a polycarbonate resin with ferrocene or ferrocene derivatives in an amount effective to provide improved flame retardant characteristics, said polycarbonate resin produced by reacting compounds selected from the group consisting of di-(monohydroxyaryl)-alkanes, dihydroxybenzenes and substituted dihydroxybenzenes with compounds selected from the group consisting of carbonic acid diesters, phosgene, bis-chlorocarbonic acid esters of di-(monohydroxyaryl)-alkanes, bis-chlorocarbonic acid esters of dihydroxybenzenes and bis-chlorocarbonic acid esters of substituted dihydroxybenzenes and said ferrocene derivatives characterized in that they do not degrade the polycarbonate resin and in that they contain a structure represented by the formula

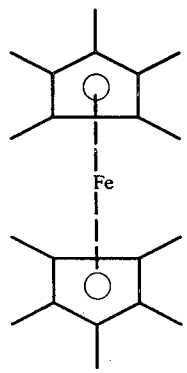

* * * * *

UNITED STATES PATENT AND TRADEMARK OFFICE
CERTIFICATE OF CORRECTION

PATENT NO. : 4,017,457
DATED : April 12, 1977
INVENTOR(S) : ARTHUR L. BARON & PARAMESWAR SIVARAMAKRISHNAN It is certified that error appears in the above-identified patent and that said Letters Patent are hereby corrected as shown below:

Column 2, lines 21 and 22, correct the spelling of "example", same column, line 27, after "or" delete the remainder of the line and insert --1,1'-(4,4'- --

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*